United States Patent
Kawai et al.

(10) Patent No.: US 11,333,272 B2
(45) Date of Patent: May 17, 2022

(54) HIGH-PRESSURE HOSE AND MANUFACTURING METHOD THEREOF

(71) Applicant: Sumitomo Riko Hosetex, Ltd., Kyoto (JP)

(72) Inventors: Koichiro Kawai, Kyoto (JP); Satoshi Senda, Kyoto (JP); Hirohisa Usui, Kyoto (JP)

(73) Assignee: Sumitomo Riko Hosetex, Ltd., Kyoto (JP)

( * ) Notice: Subject to any disclaimer, the term of this patent is extended or adjusted under 35 U.S.C. 154(b) by 0 days.

(21) Appl. No.: 17/165,956

(22) Filed: Feb. 3, 2021

(65) Prior Publication Data

US 2021/0156497 A1 May 27, 2021

Related U.S. Application Data

(63) Continuation of application No. PCT/JP2020/015022, filed on Apr. 1, 2020.

(30) Foreign Application Priority Data

Apr. 24, 2019 (JP) .............................. JP2019-082698

(51) Int. Cl.
| | |
|---|---|
| *F16L 11/08* | (2006.01) |
| *B32B 1/08* | (2006.01) |
| *B32B 25/10* | (2006.01) |

(52) U.S. Cl.
CPC .............. *F16L 11/083* (2013.01); *B32B 1/08* (2013.01); *B32B 25/10* (2013.01); *B32B 2597/00* (2013.01); *F16L 11/085* (2013.01)

(58) Field of Classification Search
CPC ......... F16L 11/083; F16L 11/085; B32B 1/08; B32B 25/10; B32B 2597/00

(Continued)

(56) References Cited

U.S. PATENT DOCUMENTS 3,357,456 A * 12/1967 Untz ...................... F16L 11/088
138/127
4,266,579 A * 5/1981 Deiss ................... B29D 23/001
138/126

(Continued)

FOREIGN PATENT DOCUMENTS

| JP | H0768659 | 3/1995 |
| JP | 4383586 | 12/2009 |

(Continued)

OTHER PUBLICATIONS

"Search Report of Europe Counterpart Application", dated Nov. 2, 2021, p. 1-p. 6.

(Continued)

*Primary Examiner* — Craig M Schneider
*Assistant Examiner* — David R Deal
(74) *Attorney, Agent, or Firm* — JCIPRNET

(57) ABSTRACT

A high-pressure hose includes: an internal rubber layer; an external rubber layer; reinforcement layers having even number of layers, two or more of the reinforcement layers are provided between the internal rubber layer (10) and the external rubber layer (20), a plurality of reinforcement wires (41a to 44a) are wound around the reinforcement layers in a spiral shape such that winding directions of the reinforcement wires (41a to 44a) alternate; and intermediate rubber layers (51 to 54), each of which is disposed between the reinforcement layers (41 to 44) having even number of layers. A same winding angle (α) is set for the reinforcement wires (41a to 44a) in all levels of the reinforcement layers (41 to 44) having even number of layers, and a winding pitch (P) of the reinforcement wires (41a to 44a) in the reinforcement layers (41 to 44) having even number of layers is set to increase in an order from a side of the internal rubber layer (10) to a side of the external rubber layer (20).

7 Claims, 4 Drawing Sheets

(58) Field of Classification Search
USPC .......................................................... 138/133
See application file for complete search history.

(56) References Cited

U.S. PATENT DOCUMENTS

| | | | | |
|---|---|---|---|---|
| RE31,047 E | * | 10/1982 | Ross .................... | F16L 11/088 138/103 |
| 4,537,222 A | * | 8/1985 | Schwarz ............. | B29C 53/8016 138/130 |
| 6,085,799 A | * | 7/2000 | Kodaissi .................... | F16L 1/16 138/135 |
| 6,230,751 B1 | * | 5/2001 | Sjotun ..................... | F16L 11/12 138/153 |
| 6,889,716 B2 | * | 5/2005 | Lundberg ................ | F16L 9/123 138/124 |
| 2001/0023713 A1 | * | 9/2001 | Niki ..................... | F16L 11/082 138/126 |
| 2006/0191587 A1 | * | 8/2006 | Gerez .................... | F16L 11/082 138/130 |
| 2008/0283138 A1 | * | 11/2008 | Rytter .................... | F16L 11/16 138/133 |
| 2018/0292030 A1 | * | 10/2018 | Burrowes ................ | B32B 5/26 |
| 2018/0299037 A1 | | 10/2018 | Yamato et al. | |
| 2021/0340361 A1 | * | 11/2021 | Anantha Narayana Iyer .............. | F16L 11/10 |

FOREIGN PATENT DOCUMENTS

| | | |
|---|---|---|
| JP | 2015101055 | 6/2015 |
| JP | 6049264 | 12/2016 |
| JP | 2017083000 | 5/2017 |

OTHER PUBLICATIONS

"Written Opinion of the International Searching Authority (Form PCT/ISA/237)" of PCT/JP2020/015022, dated Jun. 30, 2020, with English translation thereof, pp. 1-8.

"International Search Report (Form PCT/ISA/210)" of PCT/JP2020/015022, dated Jun. 30, 2020, with English translation thereof, pp. 1-7.

* cited by examiner

HIGH-PRESSURE HOSE AND MANUFACTURING METHOD THEREOF

CROSS-REFERENCE TO RELATED APPLICATIONS

This application is a continuation application of International Application number PCT/JP2020/015022, filed on Apr. 1, 2020, which claims the priority benefit of Japan Patent Application No. 2019-082698, filed on Apr. 24, 2019. The entirety of each of the above-mentioned patent applications is hereby incorporated by reference herein and made a part of this specification.

TECHNICAL FIELD

The present disclosure relates to a high-pressure hose and a manufacturing method thereof.

BACKGROUND ART

Japanese Patent No. 4383586 and Japanese Patent No. 6049264 describe high-pressure hoses, each of which includes an internal rubber layer, an external rubber layer, a plurality of reinforcement layers, and intermediate rubber layers, each of which is interposed between the plurality of reinforcement layers. The reinforcement layers of the high-pressure hose described in Japanese Patent No. 4383586 include internal reinforcement layers (inner pressure imparting layers) having even number of layers and external reinforcement layers (tension load imparting layers) having even number of layers, around which reinforcement wires are wound in a spiral shape. A winding angle of the reinforcement wires around the internal reinforcement layers having even number of layers is configured to increase from the inner side toward the outer side. A winding angle of the reinforcement wires around the external reinforcement layers having even number of layers is set to 49.7° to 51.4° that is smaller than a minimum winding angle of the internal reinforcement layers. A winding angle of the reinforcement wires around the reinforcement layers of the high-pressure hose described in Japanese Patent No. 6049264 is configured to decrease from the inner side toward the outer side.

Incidentally, a high-pressure hose is required to have high pressure resistance performance and also high flexibility. In order to secure high pressure resistance performance, a high-pressure hose typically has reinforcement layers. However, a repulsive force increases as a bending angle increases when the high-pressure hose is bent due to the inclusion of the reinforcement layers. In order for the high-pressure hose to have high flexibility, a change in repulsive force at the time of bending is required to be reduced.

SUMMARY

The present disclosure provides a high-pressure hose with excellent pressure resistance performance and high flexibility and a manufacturing method thereof.

(1. High-Pressure Hose)

A high-pressure hose according to the present disclosure includes: an internal rubber layer; an external rubber layer; reinforcement layers having even number of layers, two or more of the reinforcement layers having even number of layers provided between the internal rubber layer and the external rubber layer, wherein a plurality of reinforcement wires are wound in a spiral shape around the reinforcement layers having even number of layers such that winding directions of the reinforcement wires alternate; and intermediate rubber layers, each of which is disposed between the reinforcement layers having even number of layers. A same winding angle α is set for the reinforcement wires in all levels of the reinforcement layers having even number of layers, and a winding pitch P of the reinforcement wires in the reinforcement layers having even number of layers is set to increase in order from a side of the internal rubber layer to a side of the external rubber layer.

In the reinforcement layers of each layer, the reinforcement wires are wound in a spiral shape and are not configured to be knitted in a grid shape. Also, when the high-pressure hose is bent, a bent projecting side is deformed in a stretched manner while a bent recessed side is deformed in a contracting manner. In other words, the reinforcement wires are deformed such that the winding angle decreases on the bent projecting side. On the other hand, the reinforcement wires are deformed such that the winding angle increases on the bent recessed side.

Here, in the high-pressure hose according to the present disclosure, the same winding angle is set for the reinforcement wires of the reinforcement layers of each layer in an initial state. However, the fact that the winding angle is the same means that a design value for the winding angle is the same including variations caused in fabrication. For example, the variations caused in fabrication are within ±1°.

Also, since the same winding angle is set, it is possible to reduce a change in winding angle on the bent projecting side and a change in winding angle on the bent recessed side when the high-pressure hose is bent. It is thus possible to reduce a change in repulsive force when the high-pressure hose is bent. As a result, the high-pressure hose can have excellent pressure resistance performance and high flexibility.

(2. Manufacturing Method of High-Pressure Hose)

A manufacturing method of the high-pressure hose according to the present disclosure includes: winding the reinforcement wires in a spiral shape by causing the reinforcement wires in each layer rotating relative to the internal rubber layers while feeding the internal rubber layers in an axial direction at a constant speed; and setting a rotation speed of the reinforcement wires to be slower on a side of the external rubber layer than on a side of the internal rubber layer. In this manner, it is possible to manufacture the aforementioned high-pressure hose.

DESCRIPTION OF EMBODIMENTS (1. Application Target of High-Pressure Hose 1)

A high-pressure hose 1 is a hose that is used to distribute a high-pressure fluid in a construction machine, a civil engineering machine, an industrial machine, a vehicle, a ship, or the like. The high-pressure hose 1 includes a plurality of reinforcement layers that are made of rubber as a main component and exhibits high pressure resistance performance.

The high-pressure hose 1 is formed in a linear shape in a no load state and is brought into a bent state in a state in which the high-pressure hose 1 is attached to a counterpart member. However, the high-pressure hose 1 is not prevented from being used in a linear state. Also, the high-pressure hose 1 in a linear shape is attached to a counterpart member while being bent in an attachment operation. Here, the high-pressure hose 1 is not limited to a linear shape and may be formed in a bent shape at the time of vulcanization. Even in this case, the high-pressure hose 1 is attached to a counterpart member while being further bent or while extended in a linear shape in the attachment operation.

Therefore, the high-pressure hose 1 is required to have high pressure resistance performance and flexibility. Also, the high-pressure hose 1 in this example is a hose that can exhibit these functions.

(2. Configuration of High-Pressure Hose 1)

Figure 1:
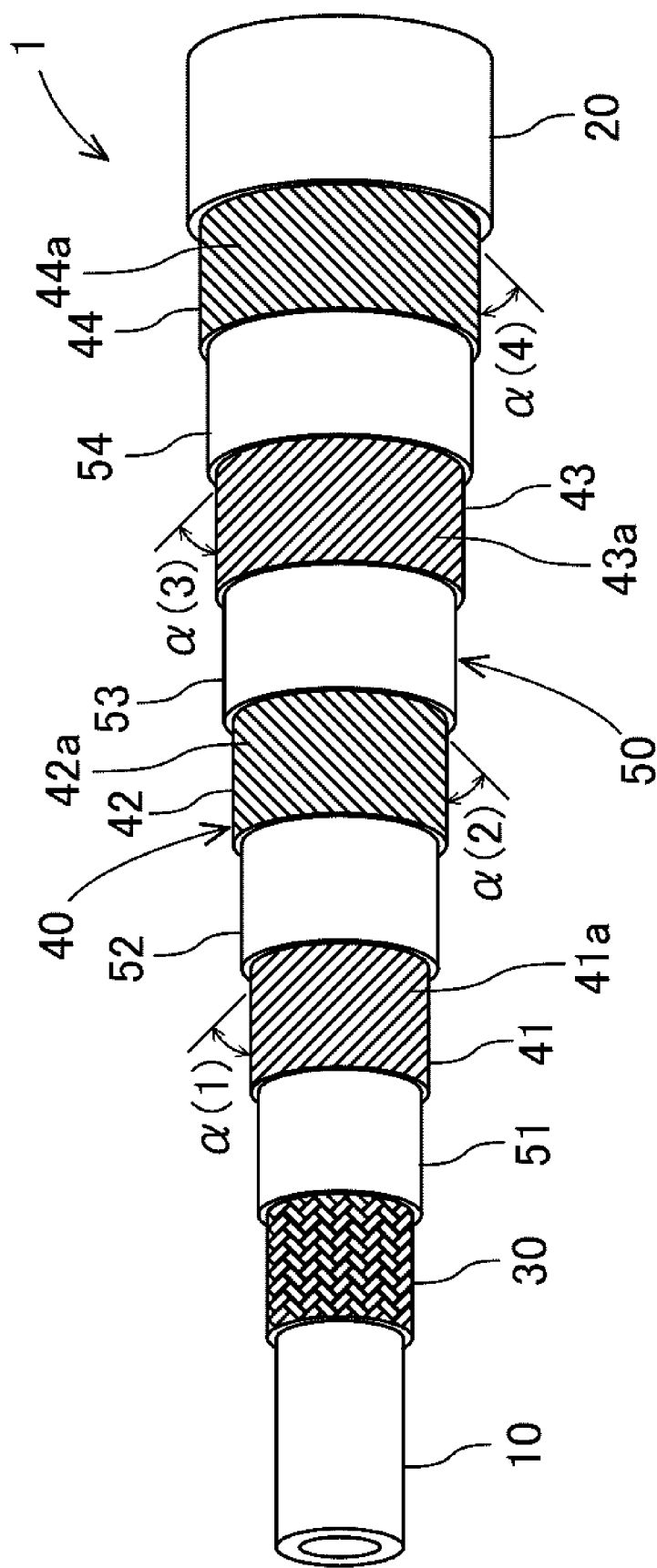
FIG. 1 is a perspective view in a manufacturing process of a high-pressure hose.

A configuration of the high-pressure hose 1 will be described with reference to FIGS. 1 and 2. As illustrated in FIG. 1, the high-pressure hose 1 includes an internal rubber layer 10 on an innermost surface. The internal rubber layer 10 is formed of a rubber material in a tubular shape. The internal rubber layer 10 may be formed into a tubular shape using an extruding device or may be formed into a tubular shape by rolling a rubber sheet. For example, the internal rubber layer 10 may be formed into a tubular shape by winding a rubber sheet in a spiral shape or may be formed into a tubular shape by connecting one end and the other end of a rubber sheet like a seaweed of sushi roll.

Examples of the rubber material used for the internal rubber layer 10 include nitrile butadiene rubber (NBR), chlorosulfonated polyethylene rubber (CSM), ethylene-propylene-diene ternary copolymer rubber (EPDM), butyl rubber (IIR), chlorinated butyl rubber (CI-IIR), brominated butyl rubber (Br-IIR), hydrin rubber (CHR, CHC), acrylic rubber (ACM), and chloroprene rubber (CR).

The high-pressure hose 1 includes an external rubber layer 20 on an outermost surface. The external rubber layer 20 is formed of a rubber material in a tubular shape. The external rubber layer 20 is formed into a tubular shape using an extruding device as will be described later. However, the external rubber layer 20 may be formed into a tubular shape by winding a rubber sheet. For example, the external rubber layer 20 may be formed into a tubular shape by winding a rubber sheet in a spiral shape or may be formed into a tubular shape by connecting one end and the other end of a rubber sheet like a seaweed of sushi roll. As the rubber material applied to the external rubber layer 20, the rubber materials mentioned in regard to the internal rubber layer 10 can be applied. Note that the same type of material may be applied or different types of materials may be applied to the internal rubber layer 10 and the external rubber layer 20.

The high-pressure hose 1 further includes a fiber layer 30 on an outer circumferential surface of the internal rubber layer 10. The fiber layer 30 has a function of restricting deformation of the internal rubber layer 10 outward in a radial direction. The fiber layer 30 is formed into a tubular shape using a fiber sheet of resin knitted into a grid shape, for example. The fiber layer 30 is formed into a tubular shape by winding a strip-shaped fiber sheet around the outer circumferential surface of the internal rubber layer 10. Examples of the resin material applied to the fiber layer 30 include vinylon (polyvinyl alcohol), polyamide (nylon), aramid, and polyethylene terephthalate (PET). Note that although the high-pressure hose 1 has the fiber layer 30 in this example, a configuration in which no fiber layer 30 is provided may be employed.

The high-pressure hose 1 further includes reinforcement layers 40 having even number of layers. In this example, the high-pressure hose 1 has four reinforcement layers 41, 42, 43, and 44. However, the high-pressure hose 1 may have only two reinforcement layers 40 or may have six or more reinforcement layers 40, the number of which is an even number.

The reinforcement layers 40 having even number of layers are provided between the internal rubber layer 10 and the external rubber layer 20. A plurality of reinforcement wires 41a, 42a, 43a, and 44a are wound in a spiral shape around the reinforcement layers 41, 42, 43, and 44 having even number of layers, respectively. Hereinafter, the level numbers of the reinforcement layers 40 are defined such that the reinforcement layer 41 that is an innermost layer corresponds to a level 1 and ascending numbers are applied from the side of the internal rubber layer 10 to the side of the external rubber layer 20. In other words, the reinforcement layer 42 corresponds to a level 2, the reinforcement layer 43 corresponds to a level 3, and the reinforcement layer 44 corresponds to a level 4. Note that a generalized level n of the reinforcement layers 40 will be appropriately used below.

Further, winding directions of the reinforcement wires 41a, 42a, 43a, and 44a around the reinforcement layers 41, 42, 43, and 44 having even number of layers alternate from the side of the internal rubber layer 10 to the side of the external rubber layer 20. In FIG. 1, the reinforcement wires 41a and 43a around the reinforcement layers 41 and 43 in the levels 1 and 3 are in the right screwing direction while the reinforcement wires 42a and 44a around the reinforcement layers 42 and 44 in the levels 2 and 4 are in the left screwing direction. Since the high-pressure hose 1 has reinforcement layers 40 having even number of layers, the number of the reinforcement layers 41 and 43 with the reinforcement wires in the right screwing direction is the same as the number of the reinforcement layers 42 and 44 with the reinforcement wires in the left screwing direction. A material with high tensile resistance performance, for example, a metal is applied to the reinforcement wires 41a, 42a, 43a, and 44a. Examples of the metal applied include a copper wire.

The high-pressure hose 1 further includes intermediate rubber layers 50. Each of the intermediate rubber layers 50 is disposed between the reinforcement layers 40 having even number of layers and between the fiber layer 30 and the reinforcement layer 41 that is an innermost layer. Therefore, the intermediate rubber layer 50 is always interposed between two adjacent reinforcement layers 40.

In this example, the intermediate rubber layer 51 is disposed between the fiber layer 30 and the reinforcement layer 41 in the level 1. The intermediate rubber layer 52 is disposed between the reinforcement layers 41 and 42 in the levels 1 and 2. The intermediate rubber layer 53 is disposed between the reinforcement layers 42 and 43 in the levels 2 and 3. The intermediate rubber layer 54 is disposed between the reinforcement layers 43 and 44 in the levels 3 and 4.

Each intermediate rubber layer 50 is formed of a rubber material in a tubular shape. The intermediate rubber layer 50 is formed into a tubular shape by winding a rubber sheet. For example, the intermediate rubber layer 50 may be formed into a tubular shape by winding a rubber sheet in a spiral shape or may be formed into a tubular shape by connecting one end and the other end of a rubber sheet like a seaweed of sushi roll. Alternatively, the intermediate rubber layer 50 can be formed into a tubular shape using an extruding device. As the rubber material applied to the intermediate rubber layer 50, rubber materials mentioned in regard to the internal rubber layer 10 can be applied. Note that the same type of material as the internal rubber layer 10 may be applied or a different type of material therefrom may be applied to the intermediate rubber layer 50.

(3. Detailed Configuration of Reinforcement Wires 41*a* to 44*a*)

The reinforcement wires 41*a* to 44*a* are wound in a spiral shape as described above. A detailed configuration of the reinforcement wires 41*a* to 44*a* will be described with reference to FIGS. 1 and 2. Particularly, winding angles α and winding pitches P of the reinforcement wires 41*a* to 44*a* will be described.

Figure 2:
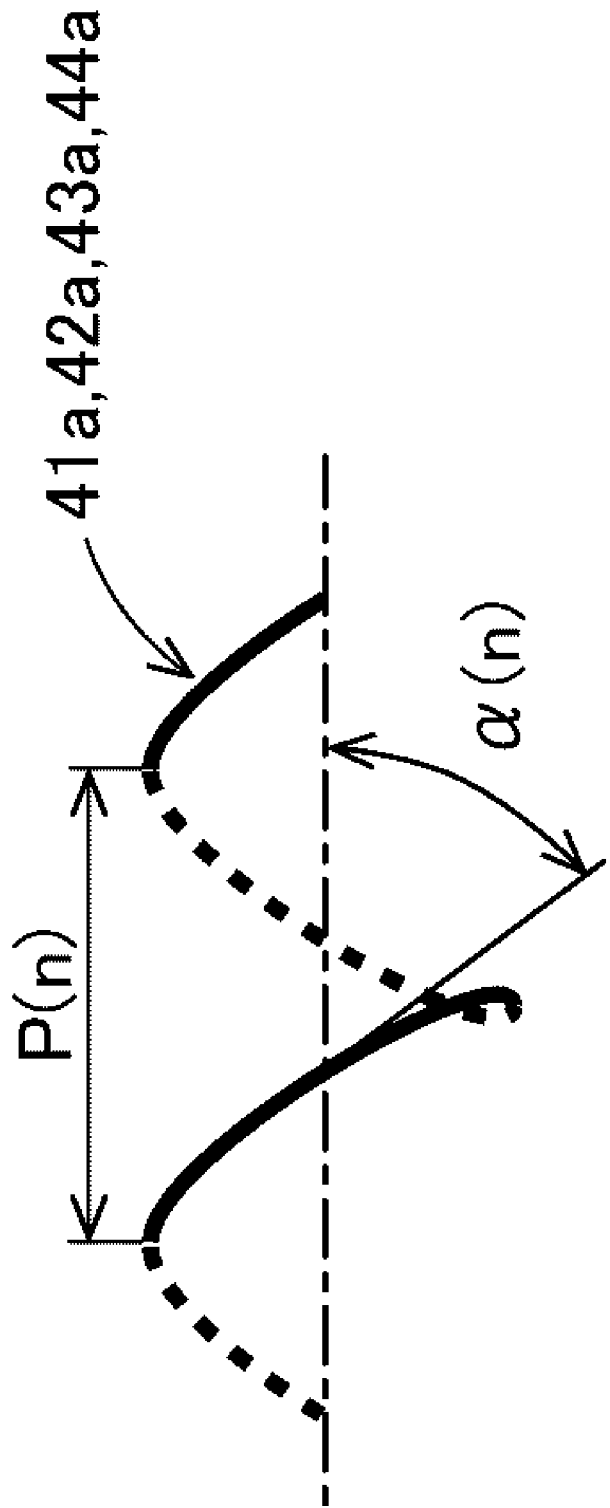
FIG. 2 is a perspective view illustrating one reinforcement wire in a reinforcement layer configuring the high-pressure hose.

As illustrated in FIG. 2, the winding angles α of the reinforcement wires 41*a* to 44*a* denote acute angles among angles formed between a line that is parallel to a center line of the high-pressure hose 1 and the reinforcement wires 41*a* to 44*a*. The winding angle α of the reinforcement wire 41*a* in the level 1 will be defined as α(1), the winding angle α of the reinforcement wire 42*a* in the level 2 will be defined as α(2), the winding angle α of the reinforcement wire 43*a* in the level 3 will be defined as α(3), and the winding angle α of the reinforcement wire 44*a* in the level 4 will be defined as α(4). Here, the winding angle α of the reinforcement wire in the level n will be defined as α(n).

In this example, the winding angles α(1), α(2), α(3), and α(4) of the reinforcement wires 41*a* to 44*a* around the reinforcement layers 41 to 44 having even number of layers in all the levels 1 to 4 are set to be the same when the high-pressure hose 1 is in a non-load state. In other words, Expression (1) is satisfied.

$$\alpha(1)=\alpha(2)=\alpha(3)=\alpha(4) \quad (1)$$

The fact that all the winding angles α(n) are the same means that the design values for the winding angles α(n) are the same including variations caused in fabrication. For example, the variations caused in fabrication are within ±1°.

Also, the winding pitch P of the reinforcement wires 41*a* to 44*a* is an interval between the reinforcement wires 41*a* to 44*a* in the axial direction as illustrated in FIG. 2. The winding pitch P of the reinforcement wire 41*a* in the level 1 will be defined as P(1), the winding pitch P of the reinforcement wire 42*a* in the level 2 will be defined as P(2), the winding pitch P of the reinforcement wire 43*a* in the level 3 will be defined as P(3), and the winding pitch P of the reinforcement wire 44*a* in the level 4 will be defined as P(4). Here, the winding pitch P of the reinforcement wire in the level n will be defined as P(n).

In this example, the winding pitches P(1), P(2), P(3), and P(4) of the reinforcement wires 41*a* to 44*a* satisfy Expression (2).

$$P(1)<P2<P3<P4 \quad (2)$$

In other words, the winding pitches P(1), P(2), P(3), and P(4) of the reinforcement wires 41*a* to 44*a* around the reinforcement layers 41 to 44 having even number of layers are set to increase in order from the side of the internal rubber layer 10 to the side of the external rubber layer 20. If this is standardized, the winding pitch (n) satisfies P(n−1)<P(n).

Here, the relationship between the winding pitches P(n) in each level n is set to be the same as that of the winding angles α(n). In other words, the winding pitch P(n) in each level n depends on the winding diameter of the reinforcement layer 40 in each level n. In other words, the winding pitch P(n) in each level n is geometrically obtained on the basis of a specific winding angle α(n) and the winding diameter of the reinforcement layer 40 in each level n.

The winding angle α can be set as in the following two cases. In the first example, the winding angles α are set to be an angle that is the same as the static angle of 54.7°. The static angle is an angle at which the reinforcement layer 40 shares a pressure equally in the axial direction and in the radial direction of the high-pressure hose 1 when an internal pressure is generated in the high-pressure hose 1. Both in a case in which the winding angle α is greater than the static angle of 54.7° and in a case in which the winding angle α is smaller than the static angle of 54.7°, the winding angle α acts such that the entire high-pressure hose 1 is deformed in such a direction that the winding angle α of each reinforcement layer 40 approaches the static angle. In other words, the amount of deformation decreases by setting all the winding angles α(n) to be the angle that is the same as the static angle of 54.7°.

In the second example, the winding angles α are set to be angles that are greater than the static angle of 54.7°. For example, all the winding angles α(n) may be set within a range of greater than 54.7° and equal to or less than 57°. In this case, the high-pressure hose 1 is unlikely to contract in the axial direction. Therefore, it is possible to prevent the high-pressure hose 1 from being easily detached from the counterpart member in a state in which the high-pressure hose 1 is attached to the counterpart member.

(4. Manufacturing Apparatus 100 of High-Pressure Hose 1)

Figure 3:
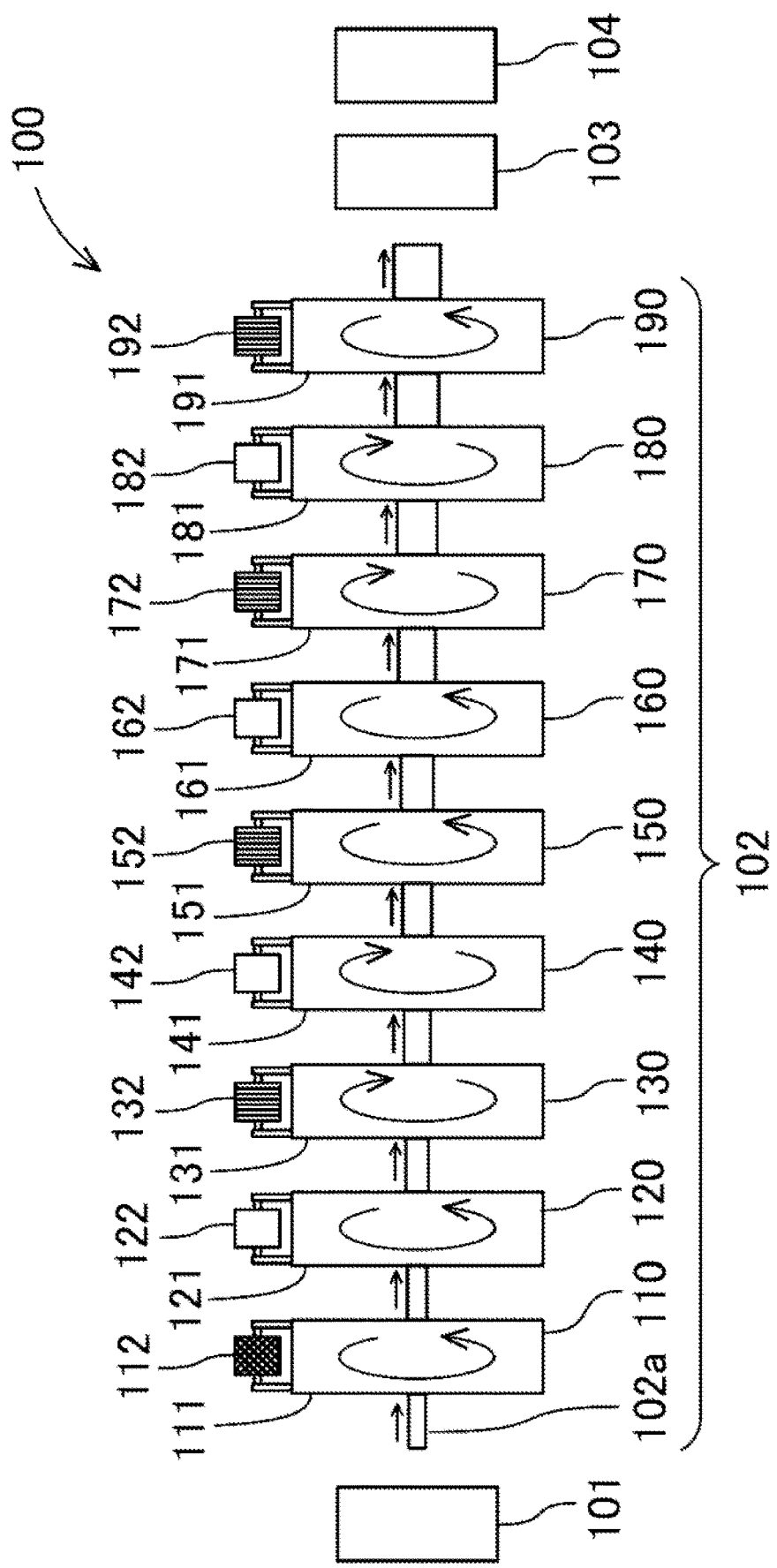
FIG. 3 is a diagram illustrating a manufacturing apparatus of the high-pressure hose.

A manufacturing apparatus 100 of the high-pressure hose 1 will be described with reference to FIG. 3. The manufacturing apparatus 100 includes an internal rubber layer extruding device 101, a winding device 102, an external rubber layer extruding device 103, and a vulcanizing device 104. The internal rubber layer extruding device 101 is a device that forms the unvulcanized internal rubber layer 10 on the outer circumferential side of a mandrel by supplying the mandrel, which is not illustrated.

The winding device 102 includes a feeding device 102*a*, a fiber layer winding device 110, an intermediate rubber layer winding device 120, a reinforcement wire winding device 130, an intermediate rubber layer winding device 140, a reinforcement wire winding device 150, an intermediate rubber layer winding device 160, a reinforcement wire winding device 170, an intermediate rubber layer winding device 180, and a reinforcement wire winding device 190.

The feeding device 102*a* is a device that feeds the internal rubber layer 10 disposed on the outer periphery of the mandrel in the axial direction at a constant speed. The fiber layer winding device 110 is a device that winds a strip-shaped material sheet for the fiber layer 30 by a wrapping method. The fiber layer winding device 110 includes a rotating drum 111 and a bobbin 112 that is attached to the rotating drum 111 and holds the strip-shaped material sheet for the fiber layer 30.

The intermediate rubber layer winding devices 120, 140, 160, and 180 are devices that wind strip-shaped material sheets for the intermediate rubber layers 50 by the wrapping method. The intermediate rubber layer winding devices 120, 140, 160, and 180 include rotating drums 121, 141, 161, and 181 and bobbins 122, 142, 162, and 182 that are attached to the rotating drums 121, 141, 161, and 181 and hold the strip-shaped material sheets for the intermediate rubber layers 50. The rotating drums 121, 141, 161, and 181 are provided so as to be able to rotate around the internal rubber layer 10 fed in the axial direction at a constant speed.

The reinforcement wire winding devices 130, 150, 170, and 190 are devices that wind the plurality of reinforcement wires 41a to 44a of the reinforcement layers 41 to 44 in a spiral shape. The reinforcement wire winding devices 130, 150, 170, and 190 include rotating drums 131, 151, 171, and 191 and bobbins 132, 152, 172, and 192 that are attached to the rotating drums 131, 151, 171, and 191 and hold the plurality of reinforcement wires 41a to 44a. The rotating drums 131, 151, 171, and 191 are provided so as to be able to rotate around the internal rubber layer 10 fed in the axial direction at a constant speed. The plurality of bobbins 132, 152, 172, and 192 are aligned at intervals in the circumferential direction at the corresponding rotating drums 131, 151, 171, and 191.

The external rubber layer extruding device 103 is a device that disposes the external rubber layers 20 on the outer circumferential surface of the reinforcement layers 44. However, a device that winds the strip-shaped material sheet for the external rubber layer 20 in a spiral shape or winds the strip-shaped material sheet such that both ends thereof are connected may be used instead of the external rubber layer extruding device 103. The vulcanizing device 104 is a device that vulcanizes the internal rubber layer 10, the external rubber layer 20, and the intermediate rubber layers 50 after the external rubber layer 20 is wound. Note that a resin sheet may be wound around the outer circumferential surface of the external rubber layer 20 in a spiral shape before and after the vulcanizing device 104 to cause the resin sheet to serve as an outer mold at the time of the vulcanization.

(5. Manufacturing Method of High-Pressure Hose 1)

Figure 4:
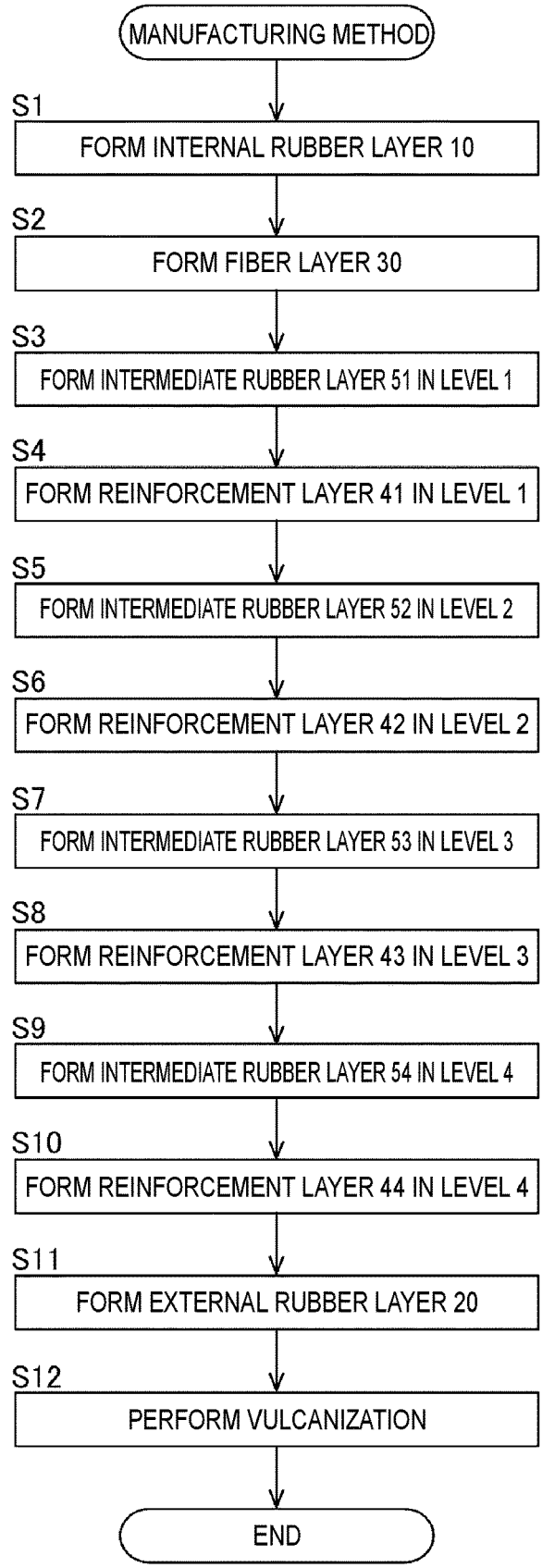
FIG. 4 is a flowchart illustrating a manufacturing method of the high-pressure hose.

A manufacturing method of the high-pressure hose 1 will be described with reference to FIGS. 3 and 4. The internal rubber layer extruding device 101 disposes the unvulcanized internal rubber layer 10 on the outer periphery of the mandrel (S1). Next, the fiber layer winding device 110 winds the strip-shaped material sheet for the fiber layer 30 with the feeding device 102a feeding the mandrel in the axial direction at a constant speed with the internal rubber layer 10 disposed on the outer peripheral side. The strip-shaped material sheet may be wound in a spiral shape, or the strip-shaped material sheet may be wound such that one end and the other end thereof are connected. In this manner, the fiber layer 30 is formed (S2).

Next, the intermediate rubber layer winding device 120 winds the strip-shaped material sheet for the intermediate rubber layer 51 in the level 1 with the feeding device 102a feeding the mandrel in the axial direction at a constant speed. The strip-shaped material sheet may be wound in a spiral shape or may be wound such that one end and the other end of the strip-shaped material sheet are connected. Also, an extruding device may be applied to the intermediate rubber winding device $120_{[41]}$. In this manner, the intermediate rubber layer 51 in the level 1 is formed (S3). Next, the reinforcement wire winding device 130 winds the plurality of reinforcement wires 41a in a spiral shape with the feeding device 102a feeding the mandrel in the axial direction at a constant speed. Here, the rotation speed of the rotating drum 131 is set such that the winding angle α(1) and the winding pitch P(1) are obtained. In this manner, the reinforcement layer 41 in the level 1 is formed (S4).

Next, the intermediate rubber layer winding device 140 winds the strip-shaped material sheet for the intermediate rubber layer 52 in the level 2 with the feeding device 102a feeding the mandrel in the axial direction at the constant speed. The strip-shaped material sheet may be wound in a spiral shape or may be wound such that one end and the other end of the strip-shaped material sheet are connected. Also, an extruding device may be applied to the intermediate rubber winding device 140. In this manner, the intermediate rubber layer 52 in the level 2 is formed (S5).

Next, the reinforcement wire winding device 150 winds the plurality of reinforcement wires 42a in a spiral shape with the feeding device 102a feeding the mandrel in the axial direction at the constant speed. Here, the rotation speed of the rotating drum 151 is set such that the winding angle α(2) and the winding pitch P(2) are obtained. In other words, the rotation speed of the rotating drum 151 of the reinforcement wire winding device 150 is slower than the rotation speed of the rotating drum 131 of the reinforcement wire winding device 130 positioned on the side of the internal rubber layer 10. In this manner, the reinforcement layer 42 in the level 2 is formed (S6).

Next, the intermediate rubber layer winding device 160 winds the strip-shaped material sheet for the intermediate rubber layer 53 in the level 3 with the feeding device 102a feeding the mandrel in the axial direction at the constant speed. The strip-shaped material sheet may be wound in a spiral shape or may be wound such that one end and the other end of the strip-shaped material sheet are connected. Also, an extruding device may be applied to the intermediate rubber winding device 160. In this manner, the intermediate rubber layer 53 in the level 3 is formed (S7).

Next, the reinforcement wire winding device 170 winds the plurality of reinforcement wires 43a in a spiral shape with the feeding device 102a feeding the mandrel in the axial direction at the constant speed. Here, the rotation speed of the rotating drum 171 is set such that the winding angle α(3) and the winding pitch P(3) are obtained. In other words, the rotation speed of the rotating drum 171 of the reinforcement wire winding device 170 is slower than the rotation speed of the rotating drum 151 of the reinforcement wire winding device 150 positioned on the side of the internal rubber layer 10. In this manner, the reinforcement layer 43 in the level 3 is formed (S8).

Next, the intermediate rubber layer winding device 180 winds the strip-shaped material sheet for the intermediate rubber layer 54 in the level 4 with the feeding device 102a feeding the mandrel in the axial direction at the constant speed. The strip-shaped material sheet may be wound in a spiral shape or may be wound such that one end and the other end of the strip-shaped material sheet are connected. Also, an extruding device may be applied to the intermediate rubber winding device 180. In this manner, the intermediate rubber layer 54 in the level 4 is formed (S9).

Next, the reinforcement wire winding device 190 winds the plurality of reinforcement wires 44a in a spiral shape with the feeding device 102a feeding the mandrel in the axial direction at the constant speed. Here, the rotation speed of the rotating drum 191 is set such that the winding angle α(4) and the winding pitch P(4) are obtained. In other words, the rotation speed of the rotating drum 191 of the reinforcement wire winding device 190 is slower than the rotation speed of the rotating drum 171 of the reinforcement wire winding device 170 positioned on the side of the internal rubber layer 10. In this manner, the reinforcement layer 44 in the level 4 is formed (S10).

Here, the rotation speeds V(1), V(2), V(3), and V(4) of the rotating drums 131, 151, 171, and 191 in the reinforcement wire winding devices 130, 150, 170, and 190 have a relation of Expression (3). In other words, the rotation speeds for the reinforcement wires 41a to 44a are set to be slower on the side of the external rubber layer 20 than on the side of the internal rubber layer 10 in a state in which the internal rubber layer 10 is fed in the axial direction at the constant speed.

$$V(1)>V(2)>V(3)>V(4) \quad (3)$$

Next, the external rubber layer extruding device 103 disposes the external rubber layer 20 so as to cover the outer circumferential surface of the reinforcement layer 44. In this manner, the external rubber layer 20 is formed (S11). Note that the strip-shaped material sheet for the external rubber layer 20 may be wound using a device that is similar to the intermediate rubber layer winding device 120 instead of the external rubber layer extruding device 103. In this case, the strip-shaped material sheet may be wound in a spiral shape or may be wound such that one end and the other end of the strip-shaped material sheet are connected. Next, each of the rubber layers 10, 20, and 51 to 54 is vulcanized by the vulcanizing device 104 (S12).

(6. Properties of High-Pressure Hose 1)

Next, properties of the high-pressure hose 1 will be described. First, the high-pressure hose 1 has high pressure resistance performance due to including the reinforcement layers 41 to 44 having even number of layers. Particularly, the high-pressure hose 1 can have higher pressure resistance performance by including four or more reinforcement layers 41 to 44. Further, the winding angles $\alpha(1)$ to $\alpha(4)$ of the reinforcement wires 41a to 44a are set to be the same as each other. Due to this, it was possible to confirm that the high-pressure hose 1 had high flexibility.

Here, the flexibility of the high-pressure hose 1 in this example and high-pressure hoses in Comparative Examples 1 and 2 was evaluated by the following evaluation method. It is assumed that the winding angles $\alpha$ of reinforcement wires 41a to 44a of the high-pressure hose in Comparative Example 1 have a relation of $\alpha(1)<\alpha(2)<\alpha(3)<\alpha(4)$. It is assumed that the winding angles $\alpha$ of reinforcement wires 41a to 44a of the high-pressure hose in Comparative Example 2 have a relation of $\alpha(1)>\alpha(2)>\alpha(3)>\alpha(4)$.

Also, the evaluation method was performed by measuring a repulsive force generated when the high-pressure hose 1 was bent into a U shape and the distance of separation between both ends of the high-pressure hose 1 was set to a predetermined value. The repulsive force of the high-pressure hose 1 in this example was smaller than the repulsive forces of the high-pressure hoses in Comparative Examples 1 and 2.

The reason that such a result was obtained will be examined. When the high-pressure hose 1 is bent, the bent projecting side is deformed in a stretched manner while the bent recessed side is deformed in a contracting manner. In other words, the reinforcement wires 41a to 44a are deformed such that the winding angles $\alpha$ decrease on the bent projecting side. On the other hand, the reinforcement wires 41a to 44a are deformed such that the winding angles $\alpha$ increase on the bent recessed side.

Here, in the high-pressure hose 1 in this example, each of the reinforcement wires 41a to 44a of the reinforcement layers 41 to 44 is set to have the same winding angle $\alpha$ in an initial state. Also, since the same winding angle $\alpha$ is set, a change in winding angle $\alpha$ on the bent projecting side and a change in winding angle $\alpha$ on the bent recessed side can be reduced when the high-pressure hose 1 is bent. It is thus possible to reduce a change in repulsive force when the high-pressure hose 1 is bent.

On the other hand, in the high-pressure hoses in Comparative Examples 1 and 2, a change in winding angle $\alpha$ on either the bent projecting side or the bent recessed side increases. Therefore, changes in repulsive forces increase when the high-pressure hoses in Comparative Examples 1 and 2 are bent. In other words, it is considered that the high-pressure hose 1 in this example has higher flexibility as compared with the high-pressure hoses in Comparative Examples 1 and 2.

Note that an increase in the number of levels of the reinforcement layers 40 leads to an increase in influence on flexibility. In other words, in a case in which the high-pressure hose 1 is configured to include four or more, or further six or more reinforcement layers 40, it is possible to secure higher flexibility by employing the same setting for the reinforcement wires 41a to 44a.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A high-pressure hose comprising:
    an internal rubber layer;
    an external rubber layer;
    reinforcement layers having even number of layers, two or more of the reinforcement layers having even number of layers provided between the internal rubber layer and the external rubber layer, wherein a plurality of reinforcement wires are wound in a spiral shape around the reinforcement layers having even number of layers such that winding directions of the reinforcement wires alternate;
    intermediate rubber layers, each of which is disposed between the reinforcement layers having even number of layers; and
    a fiber layer formed into a tubular shape by winding a strip-shaped fiber sheet around an outer circumferential surface of the internal rubber layer,
    wherein a same winding angle $\alpha$ is set for the reinforcement wires in all levels of the reinforcement layers having even number of layers, and
    a winding pitch P of the reinforcement wires in the reinforcement layers having even number of layers is set to increase in an order from a side of the internal rubber layer to a side of the external rubber layer.

2. The high-pressure hose according to claim 1, wherein the winding angle $\alpha$ of the reinforcement wires in all the levels is set to be an angle that is same as a static angle of 54.7°.

3. The high-pressure hose according to claim 2,
    wherein the reinforcement layers having even number of layers are provided four or more, and
    a number of the intermediate rubber layers provided is three or more.

4. The high-pressure hose according to claim 1, wherein the winding angle $\alpha$ of the reinforcement wires in all the levels is set to be an angle that is greater than a static angle of 54.7°.

5. The high-pressure hose according to claim 4,
    wherein the reinforcement layers having even number of layers are provided four or more, and
    a number of the intermediate rubber layers provided is three or more.

6. The high-pressure hose according to claim 1,
    wherein the reinforcement layers having even number of layers are provided four or more, and a number of the intermediate rubber layers provided is three or more.

7. A manufacturing method of the high-pressure hose according to claim 1, the method comprising:
    winding the reinforcement wires in a spiral shape by causing the reinforcement wires in each layer to rotate relative to the internal rubber layers while feeding the internal rubber layers in an axial direction at a constant speed; and
    setting a rotation speed of the reinforcement wires to be slower on a side of the external rubber layer than on a side of the internal rubber layer.

\* \* \* \* \*